(12) United States Patent
Winkler et al.

(10) Patent No.: US 8,267,237 B2
(45) Date of Patent: Sep. 18, 2012

(54) REVERSE CLUTCH FOR ROTATABLE INPUTS

(75) Inventors: Fritz Winkler, Toronto (CA); Ryszard Ostrowski, Mississauga (CA); Zoran Ivovic, Woodbridge (CA); Dejan Vukojicic, Thornhill (CA)

(73) Assignee: Magna Powertrain Inc., Concord (CA)

( * ) Notice: Subject to any disclaimer, the term of this patent is extended or adjusted under 35 U.S.C. 154(b) by 485 days.

(21) Appl. No.: 12/624,834

(22) Filed: Nov. 24, 2009

(65) Prior Publication Data

US 2010/0126822 A1 May 27, 2010

Related U.S. Application Data

(60) Provisional application No. 61/117,311, filed on Nov. 24, 2008.

(51) Int. Cl.
*F16D 27/112* (2006.01)

(52) U.S. Cl. ............................ 192/90; 192/200; 192/209
(58) Field of Classification Search .................... 192/90, 192/84.941, 200, 209
See application file for complete search history.

(56) References Cited

U.S. PATENT DOCUMENTS

| | | | |
|---|---|---|---|
| 2,724,474 A | 11/1955 | Hupp | |
| 2,875,876 A | 3/1959 | Rudisch | |
| 3,096,863 A | 7/1963 | Shefke | |
| 3,172,515 A | 3/1965 | Wrensch | |
| 3,327,823 A | 6/1967 | Miller | |
| 3,331,481 A | 7/1967 | Wrensch | |
| 4,206,837 A | 6/1980 | Brown et al. | |
| 4,606,444 A | 8/1986 | Sekella | |
| 4,828,090 A * | 5/1989 | Matsushita | 192/84.941 |
| 5,057,728 A | 10/1991 | Dammeyer et al. | |
| 6,155,386 A | 12/2000 | Hirai et al. | |
| 6,161,671 A | 12/2000 | Sakamoto et al. | |
| 6,915,887 B2 | 7/2005 | Faller et al. | |

* cited by examiner

*Primary Examiner* — Richard M. Lorence
(74) *Attorney, Agent, or Firm* — Harness, Dickey & Pierce, P.L.C.

(57) ABSTRACT

An electromagnetic clutch includes an electromagnetic coil positioned within a coil housing. A pulley rotates relative to the housing and the coil. A shaft is rotatably supported by the housing. A hub plate is fixed for rotation with the shaft. A floating element is positioned between the pulley and the hub plate. An elastomeric ring is mounted between the pulley and the floating element and provides a driving connection therebetween. The elastomeric ring is sized to urge the floating element into frictional driving engagement with the hub plate and is compressible during energization of the coil to decouple the floating element from the hub plate.

20 Claims, 3 Drawing Sheets

US 8,267,237 B2

REVERSE CLUTCH FOR ROTATABLE INPUTS

CROSS-REFERENCE TO RELATED APPLICATIONS

This application claims the benefit of U.S. Provisional Application No. 61/117,311, filed on Nov. 24, 2008. The entire disclosure of the above application is incorporated herein by reference.

FIELD

The present invention generally relates to clutches. More specifically, embodiments of the present invention are concerned with a reverse clutch for rotatable inputs.

BACKGROUND

Electromagnetic clutches are well known in the art and have been utilized commercially in many applications, including automobiles, for a number of years.

A typical electromagnetic clutch includes a rotor which generally comprises an inner annular bearing portion, a clutch portion extending generally radially outwardly from one end of the inner portion, and an outer annular portion extending from the clutch portion in a generally overlying spaced relation with respect to the inner portion. The spacing between the inner and outer annular portions receives an electromagnetic coil to be energized to create a flux field in the rotor which allows attracting a floating plate mounted to the outer annular portion for selective coupling therewith when the electromagnetic coil is energized.

The clutch portion often includes a series of arcuate slots. The purpose of the arcuate slots is to direct the flux field back and forth between the floating plate and the clutch portion of the rotor for efficient magnetic attraction between the floating plate and the rotor.

The reverse clutch, as described in this patent, comprises an additional spring mechanism (metal or elastomeric, with or without pins) that allows for a floating plate to transfer torque to the hub plate by means of friction when the coil is de-activated.

Such a clutch allows selectively coupling and uncoupling of a rotatable shaft mounted to the hub plate.

DRAWINGS

DETAILED DESCRIPTION

Figure 1:
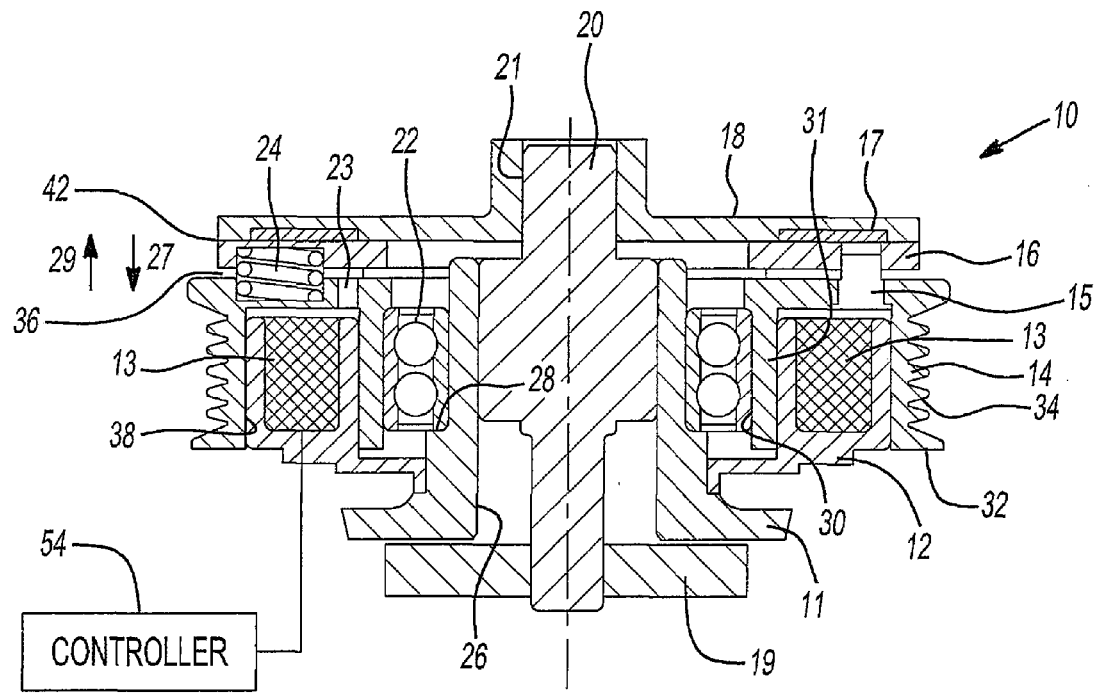
FIG. 1 is a cross section of a reverse electromagnetic clutch according to an illustrative embodiment of the present invention; the clutch being shown in its drive configuration.

Generally stated, illustrative embodiments of the present invention concern an electromagnetic clutch for selective engagement of rotatable elements such as, without limitations, shafts or hubs.

The electromagnetic clutch comprises an actuating mechanism including a spring element for engaging a rotatable element. The clutch has a drive configuration, wherein the actuating element is coupled to the rotatable element and results in torque transfer. A second, de-coupled, configuration occurs when the actuating electro-magnetic mechanism is active, wherein the actuating element is de-coupled from the rotatable element, ceasing torque transfer.

According to illustrative embodiments the clutch is further characterized as comprising an axial/torsional coupler mounted to, and between, the actuating element of the actuating mechanism and rotor. This coupler is provided:

i) for interconnecting the rotatable element and the actuating element of the actuating mechanism, ii) for biasing the actuating element towards the coupled position when the electro-magnetic actuating mechanism is activated, and iii) for damping oscillations to and from the rotatable element when the actuating mechanism is in the drive configuration.

According to illustrative embodiments, the actuating mechanism includes a fixed coil housing having a coil, a rotor, an actuating element in the form of a floating plate, an axial/torsional spring coupler attached to and positioned between the floating plate and rotor, and a rotatable hub plate. The first engaging configuration of the electromagnetic clutch results from the de-energizing of the coil, while the axial/torsional spring element provides for coupling between the actuating element and the rotatable element.

More specifically, in accordance with an aspect of the present invention, there is provided a clutch for engaging a rotatable element, the clutch comprising: an actuating mechanism including an actuating element for engaging rotatable element, an axial/torsional spring coupler attached to and positioned between the floating plate and rotor, an electromagnetic actuating mechanism in the form of a coil, coil housing and rotor; the actuating mechanism having a drive configuration, wherein the coil is de-energized and an axial/torsional spring element is enabling the actuating element to engage the rotatable element, resulting in torque transfer between the rotor, actuating element and rotatable element. The axial/torsional spring element is positioned between and coupled to the rotor and actuating element with the purpose of: i) interconnecting the rotatable element and the actuating element, ii) for biasing the actuating element away from the rotor when the electro-magnetic actuating mechanism is activated and iii) for damping oscillations to and from the rotatable element when the actuating element is in the engaged configuration.

An electromagnetic clutch includes an electromagnetic coil positioned within a coil housing. A pulley rotates relative to the housing and the coil. A shaft is rotatably supported by the housing. A hub plate is fixed for rotation with the shaft. A floating element is positioned between the pulley and the hub plate. An elastomeric ring is mounted between the pulley and the floating element and provides a driving connection therebetween. The elastomeric ring is sized to urge the floating element into frictional driving engagement with the hub plate and is compressible during energization of the coil to decouple the floating element from the hub plate.

In the following description, similar features in the drawings have been given similar reference numerals, and in order not to weigh down the figures, some elements are not referred to in some figures if they were already identified in a precedent figure.

Turning now to FIG. 1 of the appended drawings, a reverse electromagnetic clutch 10 for coupling a rotatable hub plate 18 to an actuating element 16 and a rotor or pulley 14 according to an illustrative embodiment of the present invention will be described.

According to the first illustrative embodiment, the clutch 10 allows torque transmission between the pulley 14 and the rotatable hub plate 18 to drive a shaft 20 coupled to an input member 19 of a water pump 25. Water pump 25 may be mounted to a vehicle (not shown) and driven by a motor of the vehicle.

As will become more apparent upon reading the following description, a clutch according to illustrative embodiments of the present invention is not limited to such an arrangement and/or application and can be used to generally couple one rotatable element, such as, without limitations, rotatable shaft and hub.

The reverse electromagnetic clutch 10 comprises a coil housing 12, which is mounted fixed to a frame or hub 11 and which includes coil 13; pulley 14 coaxially and rotatably mounted to hub 11. The clutch 10 further comprises actuating element 16 also described as a floating plate 16 connected respectively to the pulley 14 via the multitude of axial springs 24 and multitude of pins 15. The clutch 10 further comprises hub plate 18 which in turn contains friction material 17, as will be described herein below in more detail.

Each of these components of the clutch 10 will now be described in more detail.

The hub 11 is a cylinder-like body including a central aperture 26 rotatably supporting shaft 20. A bearing 22 is fitted to a shoulder 28 of hub 11. The bearing 22 is pressed and staked within aperture 26. Bearing 22 is received within a bore 30 extending through a skirt portion 31 of pulley 14. Bearing 22 is also pressed and staked within bore 30 to maintain the axial position of pulley 14. Pulley 14 may also include a sheave portion 32 monolithically formed with skirt portion 31. Sheave portion 32 includes a plurality of grooves 34 shaped to be drivingly engaged by a drive member such as a belt.

Coil 13 optionally contains a thermo-fuse and diode (both not shown), preventing damage to the power supply to which they are connected (not shown) in the case of clutch overheating as well as from transitional currents during clutch disengagement. Energizing coil 13 generates magnetic flux, which in turn creates attractive force between pulley 14 and floating plate 16, collapsing the spring 24, reducing a gap 36 and effectively de-coupling the clutch. The floating plate 16 movement is shown with arrow 27. Coil 13 and a portion of housing 12 are positioned within a recess 38 defined by skirt portion 31 and sheave portion 32 to minimize a distance between floating plate 16 and coil 13.

The bearing 22, pressed in and staked into the pulley 14 is itself staked and pressed over the hub 11, thus rotatably supporting pulley 14. Pulley 14 contains a number of arcuate slots 23, increasing the strength of magnetic flux between floating plate 16 and pulley 14 and coil housing 12 with coil 13.

The pulley 14 houses a multitude of pins 15 and springs 24. The multitude of pins 15 transfers the rotary movement and torque from pulley 14 to floating plate 16.

Figure 2:
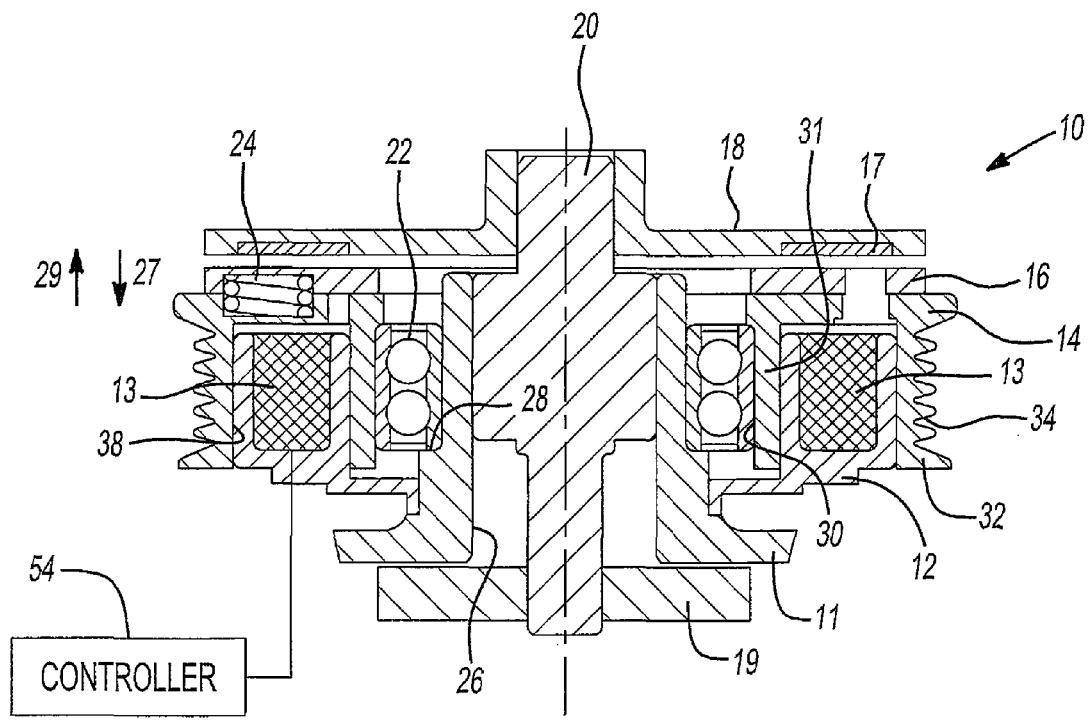
FIG. 2 is a cross section of the electromagnetic clutch from FIG. 1, illustrating the clutch in a coil engaging configuration, when the clutch is de-coupled.

The multitude of springs 24 ensures a coupling 42 between floating plate 16 and hub plate 18, with limited force acting in direction of arrow 29 which is overpowered by the attractive force generated by the magnetic flux during the coil 13 powered state, as shown in FIG. 2.

Hub plate 18 contains friction material 17. Friction material 17, which is made of high friction composite material such as ceramics, silicate or similar, is provided to enhance torque transmission between the corresponding floating plate 16 and hub plate 18 and decrease noise during the clutch engagement.

The hub plate 18 is further configured for lock-engagement with bearing shaft 20 over press fit joint 21.

Figure 3:
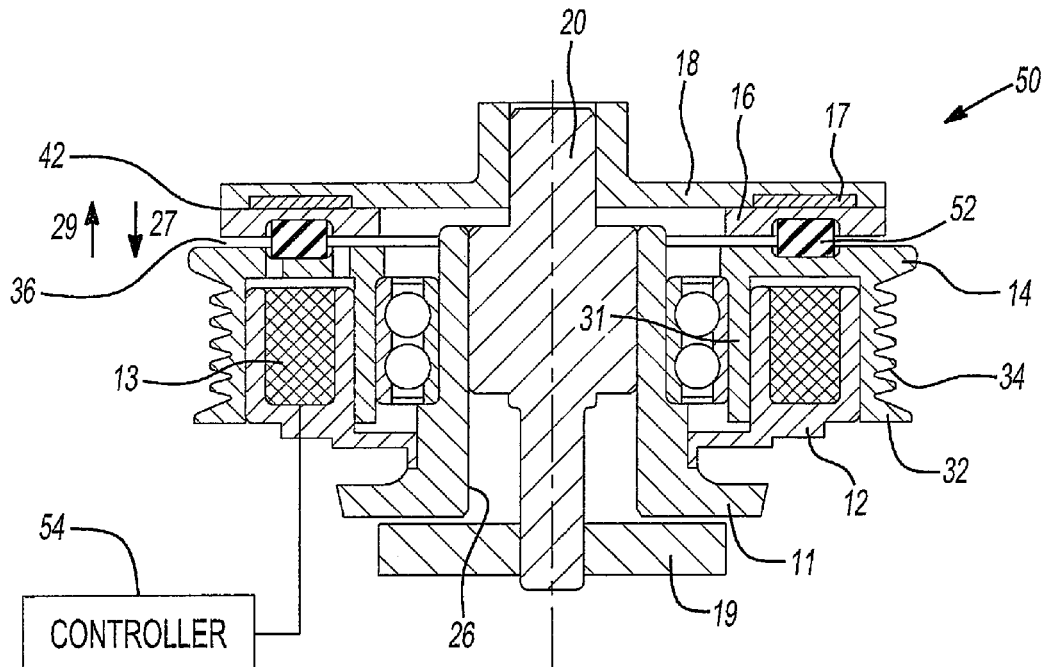
FIG. 3 is a cross section of the electromagnetic clutch with an alternative spring mechanism, the clutch being shown in its drive configuration.

Turning now to FIG. 3 of the appended drawings, a reverse electromagnetic clutch 50 for coupling of hub plate 18 to actuating element 16 and pulley 14 according to an illustrative embodiment of the present invention will be described.

The clutch 50 has the same overall structure as clutch 10 presented above, with a difference in the axial/torsional spring actuating mechanism.

The pulley 14 houses a bonded elastomeric annular shaped spring 52, which is bonded on the other side to the floating plate 16 as well. Elastomeric spring 52 transfers the rotary movement and torque from pulley 14 to floating plate 16 and ensures the torque coupling 42 between floating plate 16 and hub plate 18. The force generated by elastomeric spring 52 is defined by an applied pre-load as well as the magnitude of gap 36.

Figure 4:
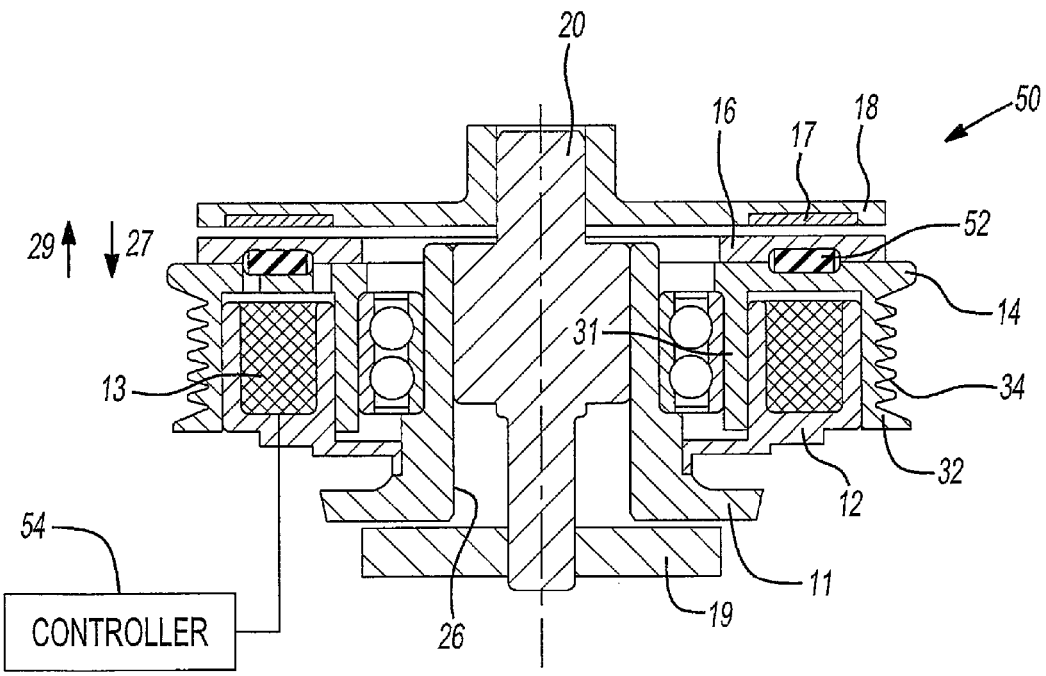
FIG. 4 is a cross section of the electromagnetic clutch from FIG. 3, illustrating the clutch in a coil engaging configuration, when the clutch is de-coupled.
Figure 5:
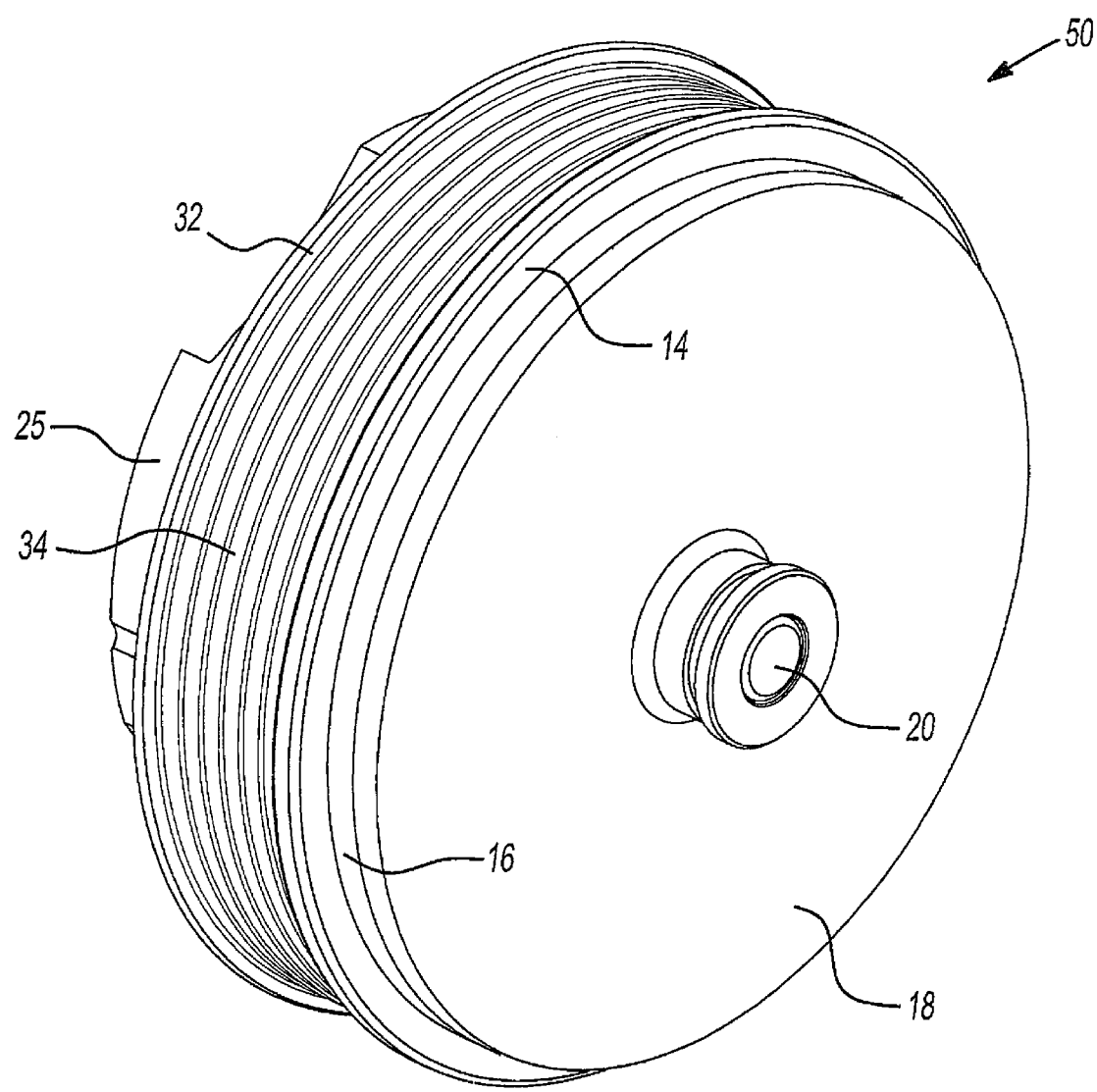
FIG. 5 is perspective view of a water pump assembly incorporating an electromagnetic clutch of the present invention.

The configuration and/or hardness of the spring 52 yield an optimized elastomeric spring rate which allows the magnetic flux forces from the coil 13 to close the gap 36 when the coil 13 is energized—movement shown with arrow 27, as shown in FIG. 4, and causes the spring biasing force to be sufficient to reinstate the gap 36 once the coil 13 is deactivated, as shown with arrow 29.

Another function of the annular elastomeric spring 52 is to provide dynamic isolation and damping of the torsional vibration between pulley 14 and floating plate 16, once it becomes coupled with hub plate 18 and clutch is engaged. This damping provides a beneficial effect on multiple components on the same drive as the aforementioned clutch.

The annular elastomeric spring 52 may be made of natural rubber. Alternatively, elastomeric spring 52 may be made of any elastomer such as silicone rubber, EPDM or a similar material. The couplers according to embodiments of the present invention are however not limited to the above illustrated embodiments. They can be made of any other suitable resilient material, and their configuration and size may differ to those illustrated.

The elastomeric spring 52 is either molded between floating plate 16 and pulley 14 or bonded to floating plate 16 and pulley 14, ensuring sufficient axial stiffness to generate adequate normal force to transfer torque between floating plate 16 and hub plate 18 over the coupling or friction joint 42 as well as providing torsional oscillation damping when the coil 13 is deactivated and the clutch engaged.

The coil 13 is connected to a controller 54 which regulates clutch operation. Controller 54 is operable to selectively cause and discontinue a flow of current through coil 13.

By controlling coil on and coil off states, a periodically engaged clutch may be provided. Periodic contact between floating plate 16 and hub plate 18 may be controlled to accomplish variable speed control between pulley 14 and hub plate 18 and shaft 20.

Returning to the clutch 10, its operation will now be described in further detail with reference to FIGS. 1 to 2.

In operation, when coil 13 is not energized, the air gap 36 is maintained by axial spring 24 which also provides normal force in direction 29 that combined with the friction coefficient in joint 42 results in torque carried through pins 15 and floating plate 16 onto hub plate 18.

With reference now to FIG. 2, once coil 13 is energized by command of controller 54, the floating plate 16 is moved from its coupled configuration of FIG. 1 to its de-coupled configuration, as shown by arrow 27, by the magnetic flux floating through coil housing 12 and pulley 14 resulting in pulley 14 attracting the corresponding floating plate 16 so as to close the gap 36 (see FIG. 1), compressing axial springs 24. A torque transmittal contact is thus broken between the floating plate 16 and the hub plate 18.

Once coil 13 is de-activated, the spring force from multitude of axial springs 24 displaces floating plate 16 in the direction of arrow 29, ensuring enough pressure in the joint 42 between the floating plate 16 and hub plate 18 to transfer torque.

A clutch according to embodiments of the present invention is not limited to include the coil-based actuating mechanism or any other electromechanical actuating mechanism. The one or more actuating mechanisms can be for example purely mechanical.

Returning to the clutch 50, its operation will now be described in further detail with reference to FIGS. 3 to 4.

In operation, when coil 13 is not energized, the air gap 36 is maintained by annular elastomeric spring 52 which also provides normal force in direction 29 that, combined with friction coefficient in joint 42, results in torque carried through annual elastomeric spring 52 and floating plate 16 onto hub plate 18.

In operation, when coil 13 is not energized and clutch 50 is operating in coupled mode, annular elastomeric spring 52 also provides for damping and isolation of torsional oscillations between pulley 14 and coupled floating plate 16 an hub plate 18.

With reference now to FIG. 4, once coil 13 is energized, the floating plate 16 is moved from its coupled configuration of FIG. 3 to its de-coupled configuration as shown by arrow 27 by the magnetic flux passing through coil housing 12 and pulley 14 resulting in pulley 14 attracting the corresponding floating plate 16 so as to close the gap 36 (see FIG. 3), compressing annular elastomeric spring 52. A torque transmittal contact is thus broken between the floating plate 16 and the hub plate 18.

Once coil 13 is de-activated, spring force from annular elastomeric spring 52 displaces floating plate 16 in the direction of arrow 29, ensuring enough pressure in the joint 42 between the floating plate 16 and hub plate 18 to transfer torque and movement.

An actuating element according to embodiments of the present invention can be in the form of any mechanical, hydro-mechanical, or electromechanical element.

A clutch according to embodiments of the present invention can be used for periodically engaging the rotatable shaft of any type and in any application. A clutch according to the present invention is therefore not limited to the drive application described herein above.

A clutch according to embodiments of the present invention can be used in any application calling for the controlled coupling of rotatable elements. These elements include full shafts, hollow shafts, rods, hubs, etc.

The configuration and size of the coupler can be adapted for the configuration of the actuating mechanism and rotatable elements to be coupled.

It is to be understood that the invention is not limited in its application to the details of construction and parts illustrated in the accompanying drawings and described herein above. The invention is capable of other embodiments and of being practiced in various ways. It is also to be understood that the phraseology or terminology used herein is for the purpose of description and not limitation. Hence, although the present invention has been described herein above by way of illustrative embodiments thereof, it can be modified, without departing from the scope of the subject invention as defined in the appended claims.

What is claimed is:

1. An electromagnetic clutch comprising:
   a coil housing;
   an electromagnetic coil positioned within the coil housing;
   a pulley supported to rotate relative to the housing and the coil;
   a shaft rotatably supported by the housing;
   a hub plate fixed for rotation with the shaft;
   a floating element positioned between the pulley and the hub plate; and
   an elastomeric ring mounted between the pulley and the floating element providing a driving connection therebetween, the elastomeric ring being sized to urge the floating element into frictional driving engagement with the hub plate and being compressible during energization of the coil to decouple the floating element from the hub plate.

2. An electromagnetic clutch as set forth in claim 1, wherein the pulley includes a series of axially extending pins slidably receiving the floating element.

3. An electromagnetic clutch as set forth in claim 1, further comprising a friction material mounted between the floating element and the hub plate.

4. An electromagnetic clutch as set forth in claim 1, wherein the coil is nested within a recess of the pulley.

5. An electromagnetic clutch as set forth in claim 1, wherein the pulley includes a skirt portion supported by a bearing mounted to the housing.

6. An electromagnetic clutch as set forth in claim 5, wherein the skirt portion and a sheave portion extend substantially coaxially with one another to define a recess in receipt of the coil.

7. An electromagnetic clutch as set forth in claim 6, wherein the pulley is monolithic such that the skirt portion and the sheave portion are one-piece.

8. An electromagnetic clutch as set forth in claim 1, wherein the shaft extends through the housing, wherein the hub plate is fixed to one end of the shaft and a water pump input member is fixed to the opposite end of the shaft.

9. An electromagnetic clutch as set forth in claim 1, further including a controller for selectively allowing and discontinuing a flow of current through the coil.

10. An electromagnetic clutch as set forth in claim 9, wherein the controller is operable to periodically allow and discontinue the coil current to variably control the speed between the pulley and the hub plate.

11. An electromagnetic clutch as set forth in claim 1, wherein the coil housing is restricted from rotation.

12. An electromagnetic clutch as set forth in claim 1, further including a cylindrical hub fixed to the coil housing and a bearing fixed to the hub by a portion of the hub being staked over the bearing.

13. An electromagnetic clutch as set forth in claim 12, wherein a portion of the pulley is staked over the bearing.

14. An electromagnetic clutch as set forth in claim 1, wherein slots extend through the pulley to allow a magnetic field from the coil to act on the floating member.

15. An electromagnetic clutch as set forth in claim 1, wherein energization of the coil initiates a fluid pumping.

16. An electromagnetic clutch for transferring power to a water pump of a vehicle having a motor, the clutch comprising:
   a hub;
   a coil housing fixed to the hub;

an electromagnetic coil positioned within the coil housing;
a pulley rotatably supported on the hub to rotate relative to the housing and the coil;
a rotatable shaft extending through an aperture in the hub;
a hub plate fixed for rotation with the shaft;
a drive member of the water pump fixed to the shaft;
a floating element positioned between the pulley and the hub plate; and
an elastomeric ring mounted between the pulley and the floating element providing a driving connection therebetween, the elastomeric ring preloaded to bias the floating element into frictional driving engagement with the hub plate, the elastomeric ring being compressible during energization of the coil to decouple the floating element from the hub plate.

17. An electromagnetic clutch as set forth in claim 16, wherein the pulley includes a series of axially extending pins slidably receiving the floating element.

18. An electromagnetic clutch as set forth in claim 17, wherein the coil is nested within a recess of the pulley.

19. An electromagnetic clutch as set forth in claim 18, wherein the pulley includes a skirt portion supported by a bearing mounted to the hub.

20. An electromagnetic clutch as set forth in claim 19, further including a controller for selectively allowing and discontinuing a flow of current through the coil.

* * * * *